(12) United States Patent
Coleman et al.

(10) Patent No.: US 9,961,108 B2
(45) Date of Patent: May 1, 2018

(54) AUTHENTICATED SENSOR INTERFACE DEVICE

(71) Applicant: Savannah River Nuclear Solutions, LLC, Aiken, SC (US)

(72) Inventors: Jody Rustyn Coleman, Aiken, SC (US); Richard W. Poland, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 0 days. days.

(21) Appl. No.: 15/249,762

(22) Filed: Aug. 29, 2016

(65) Prior Publication Data

US 2016/0366179 A1   Dec. 15, 2016

Related U.S. Application Data

(62) Division of application No. 13/666,502, filed on Nov. 1, 2012, now Pat. No. 9,473,300.

(60) Provisional application No. 61/555,214, filed on Nov. 3, 2011.

(51) Int. Cl.
| | |
|---|---|
| *H04B 10/00* | (2013.01) |
| *H04L 29/06* | (2006.01) |
| *H04L 9/08* | (2006.01) |
| *G06F 12/14* | (2006.01) |

(52) U.S. Cl.
CPC .......... *H04L 63/18* (2013.01); *G06F 12/1408* (2013.01); *H04B 10/00* (2013.01); *H04L 9/0827* (2013.01); *H04L 63/0492* (2013.01)

(58) Field of Classification Search
CPC ...................................................... H04B 10/00
See application file for complete search history.

(56) References Cited

U.S. PATENT DOCUMENTS

| | | | | |
|---|---|---|---|---|
| 4,223,217 A | * | 9/1980 | Bongard | G02B 5/005 |
| | | | | 250/227.22 |
| 4,228,469 A | * | 10/1980 | Ford, Jr. | H04N 1/00095 |
| | | | | 358/486 |
| 4,762,992 A | * | 8/1988 | Gat | G01D 5/268 |
| | | | | 250/208.2 |
| 4,797,951 A | * | 1/1989 | Duxbury | H04J 3/0626 |
| | | | | 375/260 |
| 4,915,500 A | * | 4/1990 | Selkowitz | G01J 1/04 |
| | | | | 356/221 |

(Continued)

*Primary Examiner* — Jason C Chiang
(74) *Attorney, Agent, or Firm* — Dority & Manning, P.A.

(57) ABSTRACT

A system and method for the secure storage and transmission of data is provided. A data aggregate device can be configured to receive secure data from a data source, such as a sensor, and encrypt the secure data using a suitable encryption technique, such as a shared private key technique, a public key encryption technique, a Diffie-Hellman key exchange technique, or other suitable encryption technique. The encrypted secure data can be provided from the data aggregate device to different remote devices over a plurality of segregated or isolated data paths. Each of the isolated data paths can include an optoisolator that is configured to provide one-way transmission of the encrypted secure data from the data aggregate device over the isolated data path. External data can be received through a secure data filter which, by validating the external data, allows for key exchange and other various adjustments from an external source.

6 Claims, 5 Drawing Sheets

(56) References Cited

U.S. PATENT DOCUMENTS

| | | | | |
|---|---|---|---|---|
| 5,016,961 A * | 5/1991 | Aldrich | | H04B 10/801 |
| | | | | 250/551 |
| 5,663,896 A | 9/1997 | Aucsmith | | |
| 6,198,531 B1 * | 3/2001 | Myrick | | G01J 3/28 |
| | | | | 356/213 |
| 6,466,572 B1 * | 10/2002 | Ethridge | | H04B 10/272 |
| | | | | 370/352 |
| 8,250,358 B2 | 8/2012 | Cheng | | |
| 2002/0039220 A1 * | 4/2002 | Ishii | | G02B 6/262 |
| | | | | 398/141 |
| 2003/0063891 A1 * | 4/2003 | Kim | | G02B 6/122 |
| | | | | 385/140 |
| 2003/0142984 A1 * | 7/2003 | Masuda | | H04B 10/564 |
| | | | | 398/115 |
| 2003/0190109 A1 * | 10/2003 | Litvin | | H04J 14/08 |
| | | | | 385/15 |
| 2004/0114940 A1 * | 6/2004 | Edwards | | H04B 10/1149 |
| | | | | 398/182 |
| 2004/0114942 A1 * | 6/2004 | Yee | | G02B 6/266 |
| | | | | 398/214 |
| 2004/0161246 A1 * | 8/2004 | Matsushita | | G06F 3/002 |
| | | | | 398/187 |
| 2004/0207893 A1 * | 10/2004 | Miller | | G02B 6/29373 |
| | | | | 359/223.1 |
| 2005/0033990 A1 * | 2/2005 | Harvey | | H04L 63/105 |
| | | | | 726/4 |
| 2005/0191024 A1 * | 9/2005 | Morimoto | | G02B 6/266 |
| | | | | 385/140 |
| 2006/0072872 A1 * | 4/2006 | Mitamura | | G02B 6/2931 |
| | | | | 385/18 |
| 2006/0120718 A1 * | 6/2006 | Natori | | H04B 10/032 |
| | | | | 398/19 |
| 2006/0165070 A1 * | 7/2006 | Hall | | H04L 49/101 |
| | | | | 370/369 |
| 2006/0262379 A1 * | 11/2006 | Choo | | G02B 6/3566 |
| | | | | 359/290 |
| 2007/0116143 A1 | 5/2007 | Bjerke | | |
| 2007/0174467 A1 * | 7/2007 | Ballou, Jr. | | H04L 63/0838 |
| | | | | 709/227 |
| 2010/0209116 A1 * | 8/2010 | Noda | | H04B 10/29 |
| | | | | 398/165 |
| 2010/0235561 A1 | 9/2010 | Goldring | | |
| 2010/0257353 A1 * | 10/2010 | Cheng | | H04L 63/105 |
| | | | | 713/153 |
| 2010/0328680 A1 * | 12/2010 | Moench | | G01S 7/4811 |
| | | | | 356/615 |
| 2011/0038581 A1 * | 2/2011 | Mudd | | G02B 6/3849 |
| | | | | 385/53 |
| 2011/0200192 A1 * | 8/2011 | Etemad | | H04L 9/0891 |
| | | | | 380/256 |
| 2012/0020672 A1 * | 1/2012 | Aguren | | G01M 11/3154 |
| | | | | 398/139 |

* cited by examiner

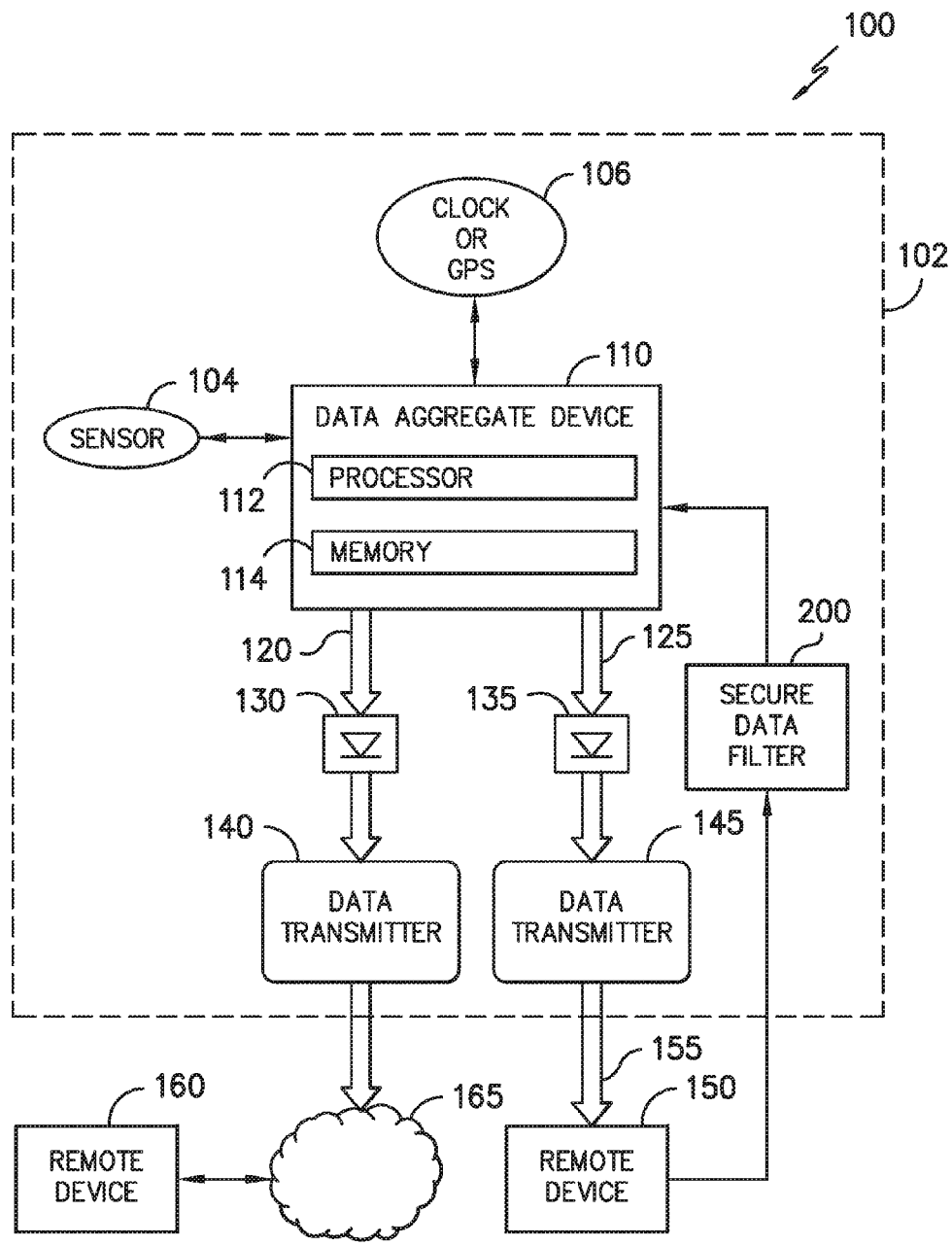
FIG. —1—

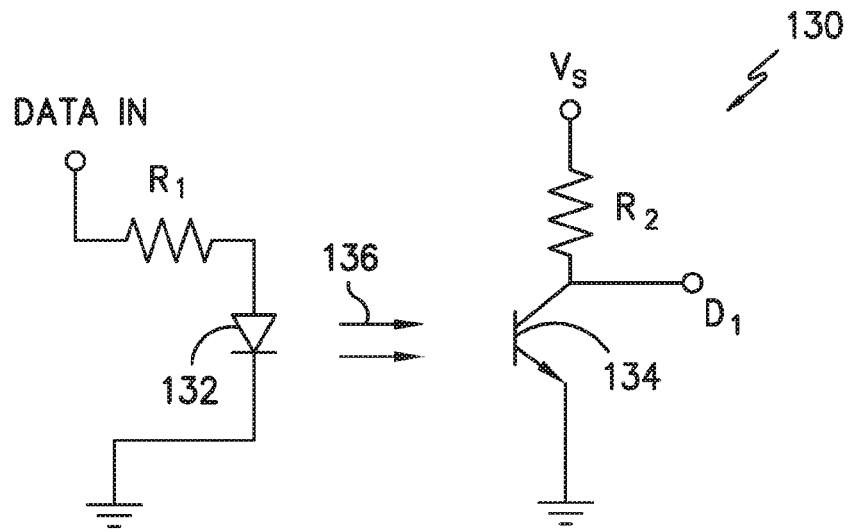
FIG. -2-
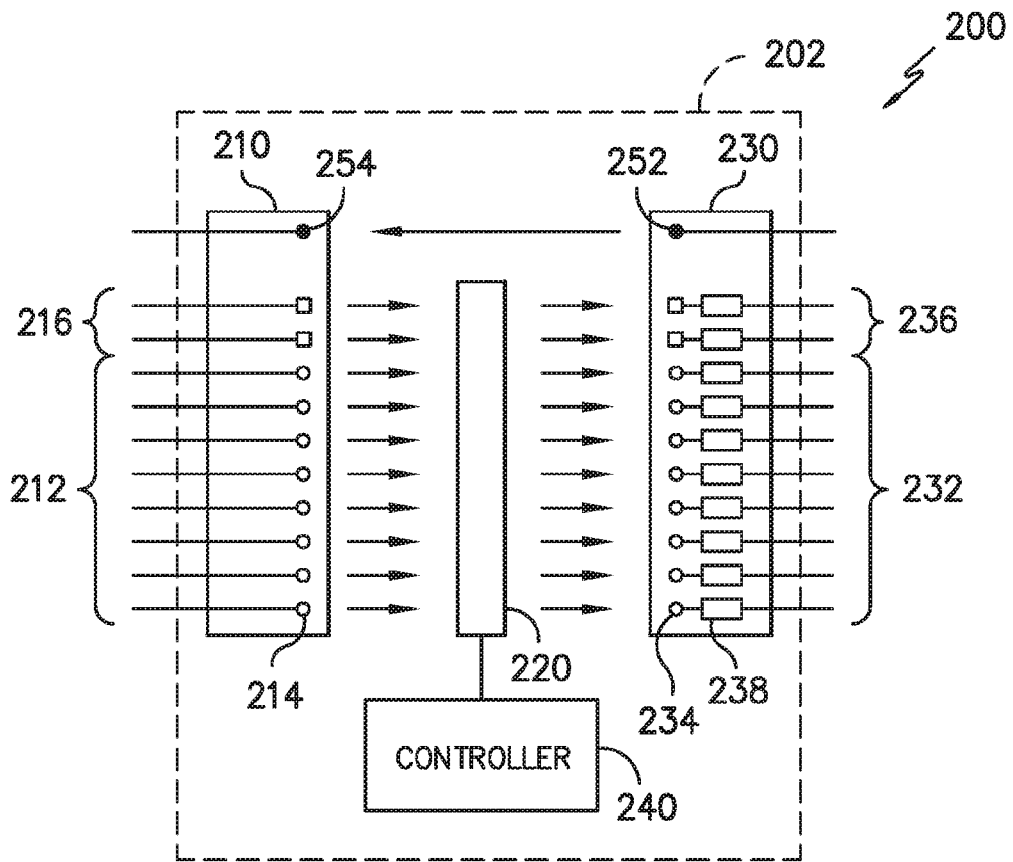
FIG. -3-

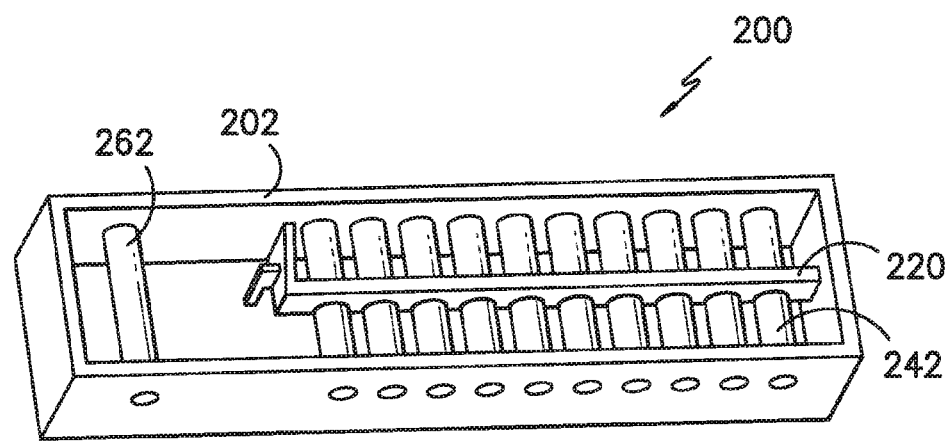
FIG. —4—
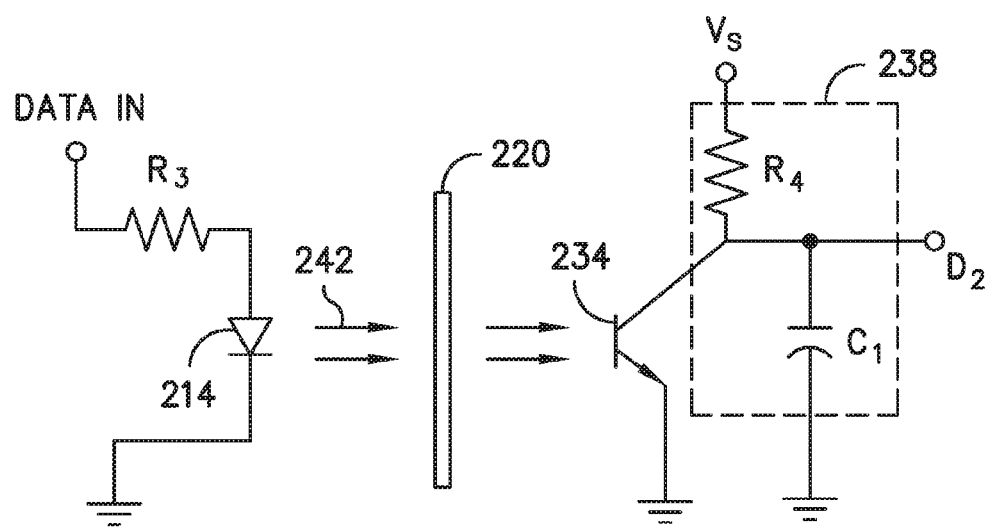
FIG. —5—

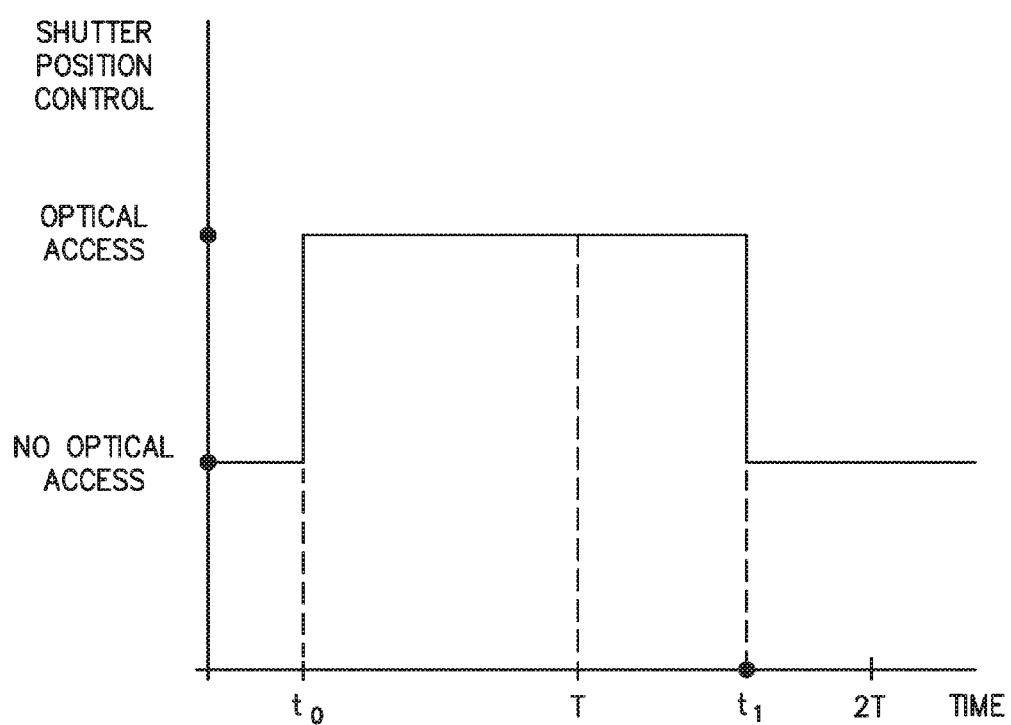
FIG. -6-

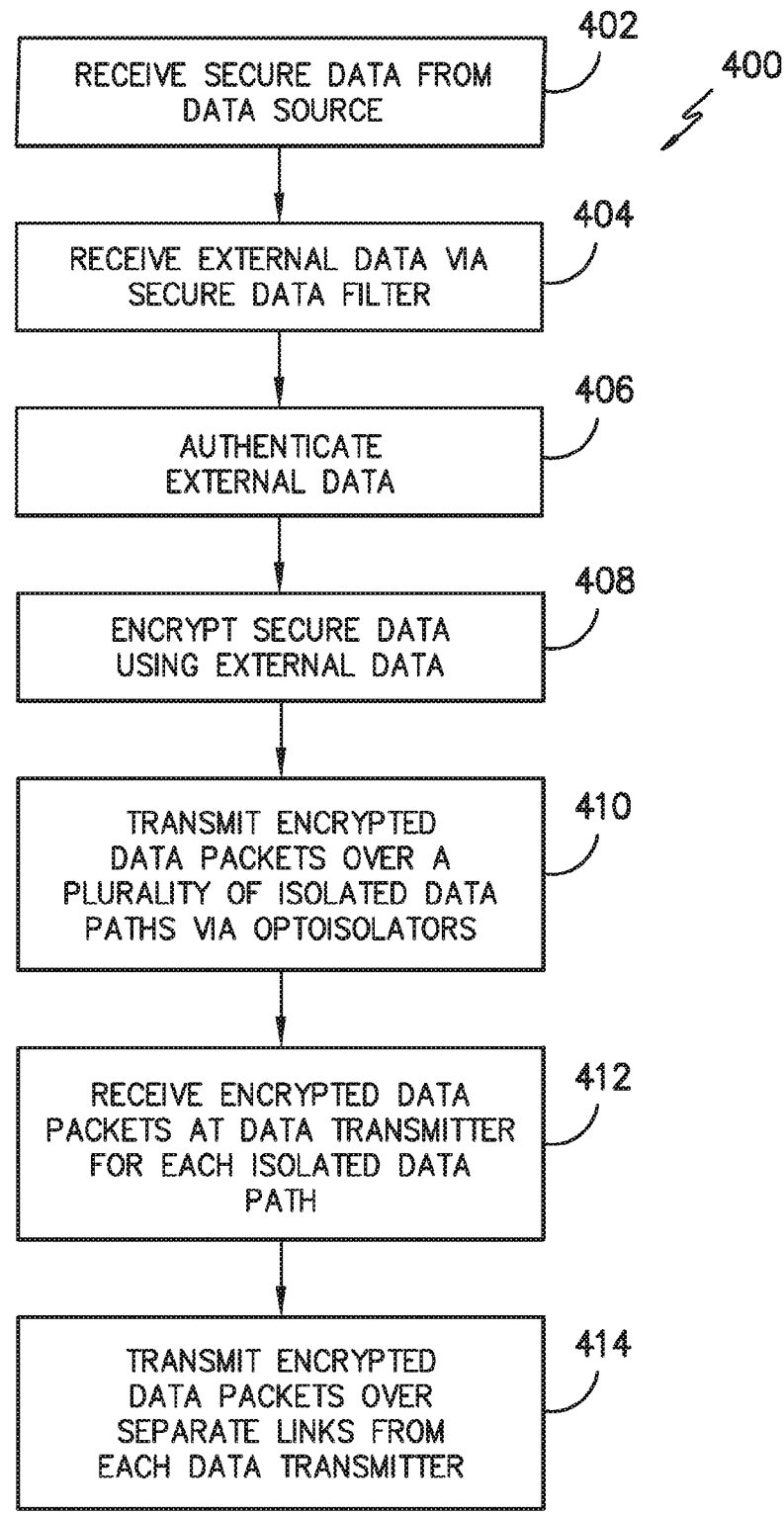
FIG. -7-

AUTHENTICATED SENSOR INTERFACE DEVICE

PRIORITY CLAIM

The present application is a divisional of U.S. Application Ser. No. 13/666,502, having a filing date of Nov. 1, 2012, which claims the benefit of priority of U.S. Provisional Patent Application No. 61/555,214, having a filing date of Nov. 3, 2011. Applicant claims priority to and benefit of all such applications and incorporate all such applications herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-085R22470 awarded by the United States Department of Energy. The Government has certain rights in the invention.

FIELD

The subject matter of the present disclosure generally relates to the secure exchange of data, and more particularly, to systems and methods for providing the secure exchange of data to multiple parties while preventing external access and manipulation of data or the data source.

BACKGROUND

While the arrival of the Internet has led to substantial improvements in the ability to communicate information around the globe, it has also given rise to a variety of security challenges in the transmission of information. For example, the transmission of data between two parties may be inappropriately intercepted or manipulated by a third-party. Hardware located at the sending party and/or the receiving party may be corrupted or hacked so that data is manipulated, stolen, or otherwise corrupted. Worse, the party that was attacked may not even be aware of the event.

The nature of the information that is intercepted can make the potential damage by such malfeasance particularly acute. The data could relate to a company's highly valuable, proprietary information. By way of further example, the data could be highly classified, secret information collected or maintained by a governmental entity. Even if a party in possession of such sensitive information does not transmit such over the Internet, the information could still be vulnerable to inappropriate access by third parties if it is stored on a device that is otherwise connected to the Internet.

The information could be real-time measurements or process data that is collected during a production or manufacturing operation. As such, the information may not only be proprietary, but the ability to transmit and store the data accurately and securely may be of paramount importance to the owner or operator of the process in terms of, for instance, safety, quality control, monitoring, etc. By way of example, it may be desirable to collect information regarding a process conducted at a company's manufacturing plant and securely transmit the same to the company's headquarters physically located some distance away from the manufacturing plant.

In the example of state or government activities, the ability to accurately monitor a process and securely store and/or transmit that information over the Internet to one or more recipients may not only be desirable but necessary. For example, a state and/or international agency may be tasked with monitoring a process related to the manufacture and/or storage of nuclear fuels or materials. In such case, the ability to securely store and simultaneously transmit such process information to multiple parties who may be in, for example, an oversight role could impact national and international security and diplomacy concerns.

Accordingly, a system for the secure storage and transmission of data over a network, such as the Internet, would be beneficial. Such a system that can be used to transmit data simultaneously to multiple recipients in a segregated fashion and to allow each to authenticate and validate the data received would be particularly useful. A system that would also preclude the recipients or third parties from inappropriately intercepting or manipulating the information transmitted to other bona fide recipients would be very useful.

SUMMARY

Aspects and advantages of the invention will be set forth in part in the following description, or may be obvious from the description, or may be learned through practice of the invention.

One exemplary aspect of the present disclosure is directed to a system for providing secure transmission of data. The system includes a data source configured to provide secure data and a data aggregate device capable of receiving the secure data from the data source. The data aggregate device is configured to encrypt the secure data into a plurality of independently encrypted data packets and to provide the independently encrypted data packets over a plurality of isolated data paths. The system further includes a plurality of optoisolators. Each of the plurality of optoisolators is disposed in one of the plurality of isolated data paths. Each of the plurality of optoisolators is configured to provide one-way transmission of data from the data aggregate device over one of the plurality of isolated data paths. The system further includes a plurality of data transmitters. Each of the plurality of data transmitters is disposed in one of the plurality of isolated data paths. Each of the plurality of data transmitters is capable of receiving one of the plurality of independently encrypted data packets from one of the plurality of optoisolators and transmitting one of the plurality of independent encrypted data packets to a remote device.

Another exemplary aspect of the present disclosure is directed to a secure data filter for receiving external data from a remote data source. The secure data filter includes a receiver having one or more optical sensors configured to receive an optical signal encoding the external data. The secure data filter further includes a sensor circuit coupled to each of the one or more sensors of the receiver. Each sensor circuit is configured to change state over a time period in response to an optical signal received at its associated optical sensor. The secure data filter further includes a movable shutter capable of preventing optical access to the one or more optical sensors. The secure data filter further includes a controller configured to actuate the movable shutter to provide optical access to the one or more optical sensors. The controller is configured to control optical access provided by the movable shutter based at least in part on the time period for each sensor circuit to change state.

Yet another exemplary aspect of the present disclosure is directed to a computer-implemented method for providing secure transmission of data. The method includes receiving, at a data aggregate device, secure data from a data source and encrypting, at the data aggregate device, the secure data to generate a first encrypted data packet and a second encrypted data packet such that the first encrypted data packet and the second encrypted data packet are encrypted independently. The method further includes transmitting the first encrypted data packet from the data aggregate device to a first isolated data path and the second encrypted data packet from the data aggregate device to a second isolated data path. Each of the first and second isolated data paths include an optoisolator configured to provide one-way transmission of data from the data aggregate device. The method further includes receiving the first encrypted data packet at a first data transmitter provided in the first isolated data path and receiving the second encrypted data packet at a second data transmitter provided in the second isolated data path. The method further includes transmitting the first encrypted data packet from the first data transmitter provided in the first isolated data path to a first remote device over a first communication link; and transmitting the second encrypted data packet from the second data transmitter provided in the second isolated data path to a second remote device over a second communication link.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figure(s), in which:

FIG. 1 provides a schematic representation of a system according to an exemplary embodiment of the present disclosure;

FIG. 2 depicts an exemplary optoisolator that can be used to provide one-way transmission of data along a data path according to an exemplary embodiment of the present disclosure;

FIG. 3 depicts a schematic representation of an exemplary secure data filter according to an exemplary embodiment of the present disclosure;

FIG. 4 depicts a perspective view of an exemplary movable shutter configured to control optical access to a receiver of an exemplary secure data filter according to an exemplary embodiment of the present disclosure;

FIG. 5 depicts an exemplary circuit diagram of an exemplary sensor circuit associated with an optical sensor of an exemplary secure data filter according to an exemplary embodiment of the present disclosure;

FIG. 6 depicts a timing diagram for actuation of a movable shutter of an exemplary secure data filter according to an exemplary embodiment of the present disclosure; and FIG. 7 depicts a flow diagram of an exemplary method according to an exemplary embodiment of the present disclosure.

DETAILED DESCRIPTION

Reference now will be made in detail to embodiments of the invention, one or more examples of which are illustrated in the figure(s). Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally the present disclosure is directed to a system and method that provides for the secure storage and exchange of data. More particularly, aspects of the present disclosure provide a system for the secure storage and transmission of data across a network, such as the Internet. In one exemplary aspect of the present disclosure, this system includes an authenticated sensor data diode that is capable of providing the following functionality: (i) reading (or querying) a variety of different data sources including, for instance, industrial sensors, medical devices, etc.; (ii) providing encryption and a uniquely changing code (e.g. a time stamp, GPS signal, and/or other methods), to secure and authenticate data packets; (iii) distributing data to one or more destinations through, for instance, an Ethernet, the Internet, or other communication media, links, or protocols; (iv) providing one-way data passing to each destination; and (v) segregating each destination from other destinations so as to prevent cross-party data manipulation of the data.

According to an exemplary aspect of the present disclosure, the authenticated sensor data diode system can include a tamper indicating enclosure to protect the integrity of the system. A data aggregate device can be configured to receive secure data from a data source, such as a sensor, and encrypt the secure data into a plurality of independently encrypted data packets using a suitable encryption technique, such as a shared private key technique, a public key encryption technique, a Diffie-Hellman key exchange technique, or other suitable encryption technique. The data aggregate device can also associate a unique code obtained from a protected data source with the encrypted data packets, such as a date/time stamp obtained from a clock or other unique data source. The unique code can provide for authentication of the encrypted data packets as well as for preventing the acceptance of replay of encrypted data by an attacker as currently valid data.

The plurality of independently encrypted data packets can be provided from the data aggregate device to different remote devices over a plurality of segregated or isolated data paths. Each of the isolated data paths can include an optoisolator that is configured to provide one-way transmission of data from the data aggregate device over the isolated data path. As used herein, an "optoisolator" can be any device configured to transmit signals using optical signals that provides electrical isolation between input and output. An optoisolator can include any light emitter and light sensor pair. For instance, an optoisolator can include a light emitting diode and a light sensor pair. As another example, an optoisolator can include, for instance, a laser emitter and a light sensor pair. The laser emitter can emit light onto the light sensor, for instance, through the use of fiber optics. Other suitable light source and light sensor pairs can be used as optoisolators without deviating from the scope of the present disclosure.

An encrypted data packet can be sent to an individual data transmitter in each isolated data path through an optoisolator provided in each isolated data path. The data transmitters can store the encrypted data packet in a memory so that it is available for future access and then provide the encrypted secure data to remote devices over a network.

Another exemplary aspect of the present disclosure is directed to a secure data filter that can be used to securely receive external data from an external data source. The secure data filter can include a receiver having a plurality of optical sensors configured to receive an optical signal from a plurality of LED emitters or other suitable light sources. A mechanical shield, such as a movable shutter, can be used to control optical access to the plurality of optical sensors. The mechanical shield in conjunction with specially designed sensor circuitry associated with the optical sensors can be used to receive external data from a potentially unsecure source into a system that must be kept secure from external attacks. The secure data filter can be provided in a tamper indicating enclosure to increase the security of the data provided through the secure data filter.

More particularly, an untrusted external source can present external data to the receiver by illuminating a series of light emitting diodes (LEDs) or other suitable light sources, such as laser emitters. Each of the light source can represent a bit of a single external data packet. In one exemplary implementation, eight light sources can be used to provide an eight bit external data packet. When the receiver is ready to receive data, a controller can actuate the movable shutter to provide optical access to the optical sensors provided in the receiver. For instance, the controller can actuate the movable shutter to remove the movable shutter from blocking the optical sensors of the receiver. The light emitted from the light sources of the external source can then be detected by the optical sensors of the receiver.

Sensor circuits associated with the optical sensors in the receiver can be configured to slowly change state over a time period to provide either a 1 output or a 0 output by either the presence or absence of light detected at the optical sensors. After expiration of the time period for the sensor circuits to change their state, but before the time period has elapsed a second time, the movable shutter can be actuated to prevent optical access to the optical sensors. As a result, even if the light sources from the external source were turned either on/off from their previous state during exposure, only one result is passed to the receiver during a single data pass. In this way, only a single external data packet (e.g. an eight bit data packet) can be passed through the secure data filter at a time.

In one embodiment, the secure data filter can be used in conjunction with the authenticated data diode of the present disclosure to receive limited external data from an external source. The external data can be a mathematical calculation or hash result that is used as part of an encryption algorithm used by the data aggregate device to encrypt the secure data from a data source. For instance, the secure data filter can allow for the use of a key encryption technique by the data aggregate device to encrypt the secure data, such as a public key encryption technique or a Diffie-Hellman exchange for calculating a symmetric key used for a symmetric encryption technique.

The authenticated data diode system according to exemplary aspects of the present disclosure can achieve various security features. For instance, malicious or fraudulent data cannot be sent back into the system from a receiving party or an external attacker by virtue of the optoisolators provided in each isolated data path. In addition, the independently encrypted data packets can be provided via isolated data paths such that one party cannot attack or manipulate data being received by another party. The unique code associated with the independently encrypted data packets by the data aggregate device can provide for authentication of the encrypted data packets to hinder the ability of an external attacker from providing false imitation data to a party. The unique code can also be used to prevent an external attacker from replaying encrypted data packets sent to a party. For instance, a date/time stamp associated with the encrypted data packets can be used to prevent replay of the encrypted data packets. Because the data is encrypted by the data aggregate device, external attackers can have difficulty reading the encrypted data packets provided from the system. Moreover, the integrity of the data source can be preserved as a result of the one-way transmission of data in the isolated data paths provided by the optoisolators.

Referring now to the FIGS., exemplary embodiments of the present disclosure will now be discussed in detail. FIG. 1 provides a schematic representation of an authenticated sensor data diode system 100 according to one exemplary embodiment of the present disclosure. One or more components of the system 100 can be included in a tamper indicating enclosure 102 to enhance the integrity of the system 100. The system 100 can include a data source such as a sensor 104. The sensor 104 can be an analog source or any other suitable source, such as a digital source. The sensor 104 can provide measurements of gas pressure, temperature, radioactivity, current, voltage, weight, flow, and/or other process variables. While the present subject matter is discussed with reference to a sensor 104 data source for purposes of illustration and discussion, those of ordinary skill in the art, using the disclosures provided herein, should understand that the data source can be any suitable data source. For instance, the data source can provide a radar image, chromatographic scan, or other collection of data.

The data source, such as sensor 104, can be enclosed in the tamper indicating enclosure 102. However, in other embodiments, one or more components of system 100 could be enclosed in the tamper indicating enclosure 102. For instance, the sensor 104 can be located external to the tamper indicating enclosure.

The system 100 also includes a data aggregate device 110. The data aggregate device 110 can be any device capable of processing data and can be processors, a microcontroller, or other computing device. The data aggregate device 110 depicted in FIG. 1 includes a processor 112 and a memory 114. The processor 112 can be any suitable processing device. The memory 114 can be any suitable computer-readable medium or media, including, but not limited to, RAM, ROM, hard drives, flash drives, optical drives, or other memory devices. The memory 114 can store instructions for execution by the processor to cause the processor to provide desired functionality. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to application-specific circuits. Of course, combinations of computer-executed software and hard-wired logic or other circuitry may be suitable, as well.

The data aggregate device 110 receives data from the data source, which is sensor 104 in the embodiment of FIG. 1. The data source can be authenticated. For example, the data source can be authenticated directly using a digital signature associated with the provided data. The data can be received over a variety of interfaces, including any analog or digital interfaces. For example, the aggregate device 110 can receive data from the sensor 104 by a serial connection, I2C, SPI, Ethernet, or a vendor proprietary communication protocol or other suitable digital or analog interface.

In a particular implementation, two-way communication is allowed between the sensor 104 and the data aggregate device 110. For example, in response to a query received from the data aggregate device 110, sensor 104 can provide data back to the data aggregate device 110. In one embodiment, the sensor 104 can configured to provide measurements only in response to query from data aggregate device 110. As such, the two-way communication between data aggregate device 110 and sensor 104 does not compromise the security of system 100.

Upon receiving data from sensor 104, the data aggregate device 110 can then encrypt the data into a plurality of independently encrypted data packets using an encryption technique. In one embodiment, the data is encrypted using a private key. In particular, a unique private key can be associated with each remote device 150 and 160 that is slated to receive the data. Two remote devices 150 and 160 are shown in FIG. 1. It should be understood that multiple additional recipients can be configured with system 100 for the receipt of data without deviating from the scope of the present disclosure.

A variety of different encryption techniques may be employed. By way of example, an encryption algorithm known as AES-128 may be used. Others may be applied as well. The use of a secure data filter 200 in conjunction with the system 100 can allow for the use of public key encryption technique to encrypt the data at the data aggregate device. For instance, the secure data filter can receive a key from an external source. This key can be used as part of a public key encryption technique, a Diffie-Hellman key exchange algorithm, or other suitable encryption technique. An exemplary secure data filter 200 will be discussed with reference to FIGS. 3-6 below.

Referring back to FIG. 1, the data aggregate device can associate a unique code from a second data source with each independently encrypted data packet. As shown in FIG. 1, the second data source can be a GPS and/or real time clock 106 that can provide the time, coordinates, or other unique information. Other data sources may also be used for the second data source as well. In still other embodiments, a second data source may not be employed. For example, the data from the first data source may already include a time stamp or some other uniquely changing code such that the second data source is unnecessary.

The uniquely changing code associated with the data at the data aggregate device 110 can provide for authentication of the data. The uniquely changing code can also prevent replay of the data. For instance, replay of data can be readily identified based on a time stamp/GPS signal associated with the data at the data aggregate device 110.

The data aggregate device 110 can be configured to provide the encrypted data packets over a plurality of isolated data paths 120 and 125. While two isolated data paths 120 and 125 are depicted in FIG. 1, those of ordinary skill in the art, using the disclosures provided herein, should understand that more or less isolated data paths can be used without deviating from the scope of the present disclosure. According to aspects of the present disclosure, an isolated data path 120 and 125 can be provided for each remote device 150 and 160 to prevent cross manipulation of data by recipients of the data. An independently encrypted data packet can be provided over each isolated data path 120 and 125.

As shown in FIG. 1, the encrypted data packets can be provided from the data aggregate device to the data paths 120 and 125 from a plurality of serial ports, one for each data path 120 and 125. As illustrated, the data from each serial port is transmitted through an associated optoisolator 130 or 135 (e.g. an associated LED-emitter and receiving pair). Optoisolators 130 and 135 provide system 100 with the one-way transmission (i.e. diode-like functionality) of data from the data aggregate device 110 over a data path because these devices only transmit data in one direction from the data-aggregate device 110 to remote devices 150 and 160.

FIG. 2 depicts an exemplary optoisolator 130 that can be used to provide one-way transmission of data along a data path according to an exemplary embodiment of the present disclosure. As shown, the optoisolator can include a light emitting diode (LED) 132 and optical sensor 134 pair. Other suitable light sources can be used. The LED 132 can receive the data input through resistor R1 and emit an optical signal 136. The optical sensor 134 can receive the optical signal 136 and include a sensor circuit that provides an output $D_1$ in response to the optical signal 136. The sensor circuit of FIG. 2 includes the optical sensor 134 and a resistor R2. Those of ordinary skill in the art, using the disclosures provided herein, should understand that a variety of different sensor circuits can be used in conjunction with optoisolator 130 without deviating from the scope of the present disclosure.

As illustrated in FIG. 2, data can only pass in one direction through the optoisolator 130. In particular, data can only pass through the optical signal 136 from the LED 132 to the optical sensor 134. Data cannot pass from the optical sensor 134 to the LED 132.

Referring back to FIG. 1, the data from the optoisolators 130 and 135 can be provided, via serial transmission, to data transmitters 140 and 145 to be stored in a memory and routed using a variety of techniques and/or hardware. For example, as shown in FIG. 1, data from optoisolator 135 can be transmitted out of the tamper indicating enclosure 102 by a transmitter 145 over a first communications link 155 to remote device 150. The first communications link 155 can be a direct connection or a connection over a network, such as a local area network. Where direct connections are used, a direct connection is provided for each recipient.

Data from optoisolator 130 can be transmitted out of the tamper indicating enclosure 102 by a data transmitter 140 to remote device 160 over a second communications link that includes network 165. The network can include any suitable network, such as a local area network, wide area network, the Internet, etc., and can include any number of wired or wireless links. The data transmitters 140 and 145 can include a memory to store encrypted data packets for future access by remote devices.

In one exemplary method of operation of the system 100, the data aggregate device 110 receives data from the sensor 104. The data aggregate device 110 then encrypts the data into independently encrypted data packets and associates with the data packets a unique code from a predictable changing data source such as GPS/clock 106. The encrypted data packets can then be sent over a plurality of isolated data paths through optoisolators 130 and 135 to implement the data diode. Transmitted data is provided to remote devices 150 and 160 either through a direct connection or over a network.

The isolated data paths and independent encryption of the data packets prevent any one party from hacking or manipulating the data being received by another party or by the data aggregator device 110. An external attacker on a particular party's line (the Internet for example) could, at worst, breach the data transmitting device, but could not compromise the data aggregate device 110 or the data received by other parties. The victim party could detect this breach by receiving improperly encrypted data or no data at all. Replay of encrypted data is also prevented by the predictable and uniquely changing data that is included in each packet.

FIG. 3 depicts a schematic diagram of an exemplary secure data filter 200 according to an exemplary aspect of the present disclosure. The secure data filter 200 can be used in conjunction with the system 100 of FIG. 1, for instance, to receive a key used by the data aggregate device 110 to encrypt data from the sensor 104. The secure data filter 200 provides for the delivery of generally small amounts of data in such a way to reduce the capability of an external hacker from compromising the system 100. One or more components of the secure data filter 200 can be provided in a tamper indicating enclosure 202 to enhance the integrity of the secure data filter 200.

As shown in FIG. 3, the secure data filter 200 can include a receiver 230 capable of receiving data from an external source 210 via optical signals. More particularly, an external source 210 can include a plurality of LEDs 214 or other light sources that are used to transmit an external data packet via optical signals. In the exemplary configuration of FIG. 3, the external source 210 includes eight LEDs 214 configured to transmit an eight bit data packet 212 via optical signals. The number of bits could range from 1 bit to any number of bits without deviating from the scope of the present disclosure. In addition to the LEDs 214 for presenting the eight bit data packet 212, the external source 210 can optionally include LEDs for transmitting a one or two bit checksum 216 along with the data packet. The checksum 216 can be used to check the integrity of the data.

The receiver 230 can include an array of optical sensors 234 configured to detect the optical signals received from the array of LEDs 214 of the external source 210. In particular, the receiver 230 can include eight optical sensors 234, one for each bit in the eight bit data packet 212 sent from the external source 210. The receiver 230 can optionally also include one or two optical sensors 234 configured to receive the one or two bit checksum 216 provided from the external source 210.

The receiver 230 can further optionally include one or more LEDs 252 which can provide data via optical signals to an optical sensor 254 at the external source 210. This link can be used, for instance, to indicate to the external source 210 that the receiver 230 is prepared to accept data. The link can also be used to indicate any checksum errors or to provide other suitable exchange of data.

The secure data filter 200 further includes a movable shutter 220 configured to control optical access to the plurality of optical sensors 234 of the receiver 230. The movable shutter 220 can be actuated by a controller 240 between a first position that prevents optical access to the optical sensors 234 of the receiver 230 and a second position which allows optical access to the optical sensors 234. In this manner, the movable shutter 220 can be actuated to control the flow of data via optical signals between the external source 210 and the receiver 230. The controller 240 can be configured to actuate the movable shutter 220 based on a timing schedule. The timing schedule can specify periodic time periods for the receiver 230 to receive data.

FIG. 4 depicts the use of a movable shutter 220 to control optical access to the optical sensors 234 of a secure data filter 200 according to an exemplary embodiment of the present disclosure. As shown, in FIG. 4, the movable shutter 220 is positioned to interrupt the optical signals provided via light pipes 242 from an external source 210 to the receiver 230. Because the movable shutter 220 is positioned to interrupt the light pipes 242, the flow of data between the external source 210 and the receiver 230 can be prevented. As shown in FIG. 4, the movable shutter 220 can be arranged so as not to interrupt a light pipe 262 provided from the receiver 230 to the external source 210.

To allow for the flow of data between the external source 210 and the receiver 230, the movable shutter 220 can be actuated so that the movable shutter no longer interrupts the optical signals 242. This allows the optical signals 242 to be detected by the optical sensors 234 of the receiver, providing for the flow of data to the receiver 230.

Referring back to FIG. 3, each of the optical sensors 234 of the receiver 230 can be associated with a sensor circuit 238. The sensor circuit 238 for each optical sensor 234 can be configured to slowly change state over a time period in response to detected light at its associated optical sensor 234. The sensor circuits 238 can provide an output that is representative of the data sent by the external source 210. For instance, the sensor circuits 238 can be provide an eight bit output 232 representative of the eight bit data packet 212 received from the external source 210. The sensor circuits 238 can also optionally provide a one or two bit checksum output 236 representative of the one or two bit checksum 216 provided from the external source 210.

FIG. 5 depicts an exemplary circuit diagram of a LED/optical sensor pair used in a secure data filter according to an exemplary embodiment of the present disclosure. As shown, the LED 214 can receive data input through resistor $R_3$ and emit an optical signal 242. Provided that movable shutter 220 is not preventing optical access to the optical sensor 234, the optical sensor 234 will receive the optical signal 242. The sensor circuit 238 provides an output $D_2$ that slowly changes state over a time period in response to receiving the optical signal 242. The sensor circuit 238 depicted in FIG. 5 is a resistor-capacitor (RC) circuit that includes a resistor $R_4$ and a capacitor $C_1$. The resistance of the resistor $R_4$ and the capacitance of the capacitor $C_1$ can be selected to provide a slow response time period for the output $D_2$ of the sensor circuit 238 to change state, such as 1-2 seconds. Other suitable sensor circuits 238 can be used without deviating from the scope of the present disclosure, such as a Schmitt trigger circuit or other time-delay circuit or spike filtering circuit.

According to exemplary aspects of the present disclosure, the position of the movable shutter 220 is controlled based on the time period for the sensor circuit to change state. More particularly, the controller 240 (depicted in FIG. 3) can be configured to control actuation of the movable shutter 220 based at least in part on the time period for each sensor circuit 238 to change state. In one aspect, the controller 240 actuates the movable shutter 220 to provide optical access to the one or more optical sensors 234 during the time period for each sensor circuit 238 to change state. After expiration of the time period, but prior to expiration of twice the time period, the controller 240 can actuate the movable shutter 220 to prevent optical access to the one or more optical sensors 234.

The timing of the actuation of the movable shutter 220 can be more readily appreciated with reference to FIG. 6. FIG. 6 plots the position of the movable shutter 220 over time. At time $t_0$, the controller 240 actuates the movable shutter 220 to provide optical access to the optical sensors 234 of the receiver 230. At time $t_1$, the controller 240 actuates the movable shutter 220 to prevent optical access to the optical sensors 234 of the receiver 230. The time $t_1$ occurs after expiration of a time period (T) required for the sensor circuits 238 associated with the optical sensors 234 to change state. The time $t_1$ also occurs before the expiration of twice the time period (2T) for the sensor circuits 238 associated with the optical sensors 234 to change state.

In this manner, the secure data filter 200 can allow only a single data packet to pass to the receiver during when the movable shutter 220 is in a position to provide access to the optical sensors 234. Even if the LEDs 214 of the external source 210 were turned either on/off from their previous state during exposure, only one result would get passed through the receiver 230 by virtue of the slowly changing sensor circuits 238. In this way, only a single data packet, such as an eight bit data packet, can be passed through the secure data filter 200 at a time.

FIG. 7 depicts a flow diagram of an exemplary method 400 of operating the data diode system 100 of FIG. 1 according to an exemplary aspect of the present disclosure. While the method 400 is discussed with reference to the exemplary system 100 of FIG. 1, the method 400 can be implemented with other suitable systems. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (402), the method includes receiving data from a secure data source. For instance, the data aggregate device 110 can receive data from sensor 104. The data can include sensor measurements or any other suitable data received from the data source. In an exemplary embodiment, the data can be received from the data source over a two-way communication link. The data can be received only in response to query such that two-way communication with the data source does not compromise the security of system.

At (404), the method includes receiving external data via a secure data filter. For instance, the data aggregate device 110 can receive external data from the secure data filter 200. The external data can be a key used as part of an encryption technique used to encrypt the data received from the data source.

At (406), the method includes authenticating the external data. For instance, the data aggregate device 110 can authenticate the external data received from the secure data filter 200. This can ensure that the external data received from a remote source is original and non-tampered data from a legitimate remote party. In one example, the authentication can be achieved by digital signing, such as the signing used in public/private key encryption techniques.

The secure data received from the data source is encrypted at (408). For instance, the data aggregate device 110 can encrypt the secure data received from the sensor 104 into a plurality of independently encrypted data packets. Any suitable encryption technique can be used without deviating from the scope of the present disclosure. In the event the external data received at the data aggregate device at (404) is an encryption key, the encryption algorithm can be a shared key encryption technique, such as a public key encryption technique, Diffie-Hellman key exchange technique, or other suitable encryption technique.

At (410), the encrypted data packets are transmitted over a plurality of isolated data paths through optoisolators. For instance, the data aggregate device 110 can provide the encrypted data packets to isolated data paths 120 and 125 via optoisolators 130 and 135. The optoisolators 130 and 135 can provide one-way transmission of data along the isolated data paths 120 and 125 such that the optoisolators 130 and 135 provide data diode functionality.

At (412), the encrypted data packets are received from the optoisolators at data transmitters provided in the plurality of data paths. For instance, an encrypted data packet from optoisolator 130 can be received at data transmitter 140. An encrypted data packet from optoisolator 135 can be received at data transmitter 145. The data transmitters can store the encrypted data packets in a memory for future access.

At (414), the method includes transmitting the encrypted data packets from the data transmitters over separate communication links. For instance, the data transmitter 140 can transmit an encrypted data packet to remote device 160 over a communication link that includes network 165. The data transmitter 145 can transmit the encrypted secure data to remote device 150 over communication link 155. In this manner, the encrypted secure data can be provided to different parties via isolated data paths such that one party cannot attack or manipulate data being received by another party.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A secure data filter for receiving external data from a remote data source, the secure data filter comprising:
   a receiver comprising one or more optical sensors configured to receive an optical signal encoding the external data, the receiver further comprising one or more light-emitting diodes configured to transmit one or more optical signals to the remote data source, the one or more optical signals indicating the receiver is prepared to receive the optical signal encoding the external data ;
   a sensor circuit coupled to each of the one or more sensors of the receiver, each sensor circuit configured to change state over a time period in response to an optical signal received at its associated optical sensor;
   a movable shutter capable of preventing optical access to the one or more optical sensors; and
   a controller configured to actuate the movable shutter to provide optical access to the one or more optical sensors, the controller configured to control optical access provided by the movable shutter based at least in part on the time period for each sensor circuit to change state by:
      actuating the movable shutter to provide optical access to the one or more optical sensors during the time period for each sensor circuit to change state; and
      after expiration of the time period but prior to expiration of twice the time period, actuating the movable shutter to prevent optical access to the one or more optical sensors.

2. The secure data filter of claim 1, wherein the receiver comprises eight optical sensors, each optical sensor configured to receive a single bit of external data via an optical signal.

3. The secure data filter of claim 1, wherein the receiver comprises an additional optical sensor configured to optically receive a checksum for the external data.

4. The secure data filter of claim 1, wherein the controller is configured to periodically actuate the movable shutter to provide optical access to the one or more optical sensors based at least in part on a timing schedule.

5. The secure data filter of claim 1, wherein the sensor circuit comprises at least one of a resistor-capacitor circuit (RC circuit) or a Schmitt trigger.

6. The secure data filter of claim 1, wherein the receiver is positioned within an enclosure of the secure data filter; wherein the sensor circuit is positioned within the enclosure; and wherein the movable shutter is positioned within the enclosure.

* * * * *